United States Patent [19]
Wise

[11] Patent Number: 4,627,477
[45] Date of Patent: Dec. 9, 1986

[54] LATHE, DUPLICATING

[76] Inventor: Mahlon Wise, 1709 S. Pulaski, South Bend, Ind. 46613

[21] Appl. No.: 668,333

[22] Filed: Nov. 5, 1984

[51] Int. Cl.[4] .......................... B23B 3/28; B23Q 35/10
[52] U.S. Cl. .......................................... 142/7; 142/55; 82/14 R; 82/27
[58] Field of Search ..................... 142/7, 55; 82/14 R, 82/27

[56] References Cited
U.S. PATENT DOCUMENTS

| | | | |
|---|---|---|---|
| 1,363,238 | 12/1920 | Duchemin | 142/7 |
| 2,880,767 | 4/1959 | Rodgers | 142/55 |
| 3,512,561 | 5/1970 | Cortez | 142/55 |
| 3,863,691 | 2/1975 | Schmidt | 142/7 |
| 3,960,188 | 6/1976 | Schmidt | 142/7 |
| 4,000,766 | 1/1977 | Sutcliffe | 82/14 R |
| 4,227,557 | 10/1980 | Allen | 142/7 |

FOREIGN PATENT DOCUMENTS

| | | | |
|---|---|---|---|
| 2459648 | 7/1975 | Fed. Rep. of Germany | 142/7 |
| 7709460 | 2/1979 | Netherlands | 142/7 |

Primary Examiner—Francis S. Husar
Assistant Examiner—Jerry Kearns
Attorney, Agent, or Firm—Paul H. Gallagher

[57] ABSTRACT

A workpiece is rotated by a variable speed motor, and a cutter bit is rotated by a variable speed motor. A carriage is moved along the workpiece by a threaded rod driven by a variable speed motor, and the cutter bit is mounted in the carriage. The carriage extends transversely across the lathe, with one end threadedly engaging the threaded rod, and fed therealong. The carriage is swingable about the threaded rod, to a lower operable position, and in that position it engages a template, and also in that position, the cutter bit engages the workpiece.

5 Claims, 6 Drawing Figures

LATHE, DUPLICATING

FIELD OF THE INVENTION

The invention resides in the field of duplicating woodworking lathes, particularly such lathes of simple type and as such, well adapted to home workshops. A special field where they are particularly useful is in making and repairing furniture.

OBJECTS OF THE INVENTION

A broad object of the invention is to provide a duplicating woodworking lathe having the following features and advantages:

1. A rotatable cutter bit is provided, enabling slow rotation of the wooden workpiece.
2. A workpiece is produced that is of such extremely fine finish such as to eliminate the necessity of sanding, notwithstanding the slow speed of rotation of the workpiece.
3. Whipping and wobbling of the workpiece is eliminated because of the slow speed of rotation of the workpiece, this being particularly pronounced, comparatively, in the case of a thin workpiece.
4. The selection and use of a template or pattern is accommodated and facilitated, for producing the desired shape of workpiece.
5. The lathe includes a simple construction of carriage, carrying the cutter bit, whereby to greatly facilitate setting up of the lathe.
6. The lathe includes a plurality of components that are independently variable, to accommodate the hardness and the diameter of the wood, and to produce desired depth of cut and speed of transverse movement of the cutter bit.
7. The cutter bit, because of its rotation, can be used for cutting longitudinal formation in the workpiece, upon holding of the workpiece stationary against rotation.

DESCRIPTION OF A PREFERRED EMBODIMENT

Figure 1:
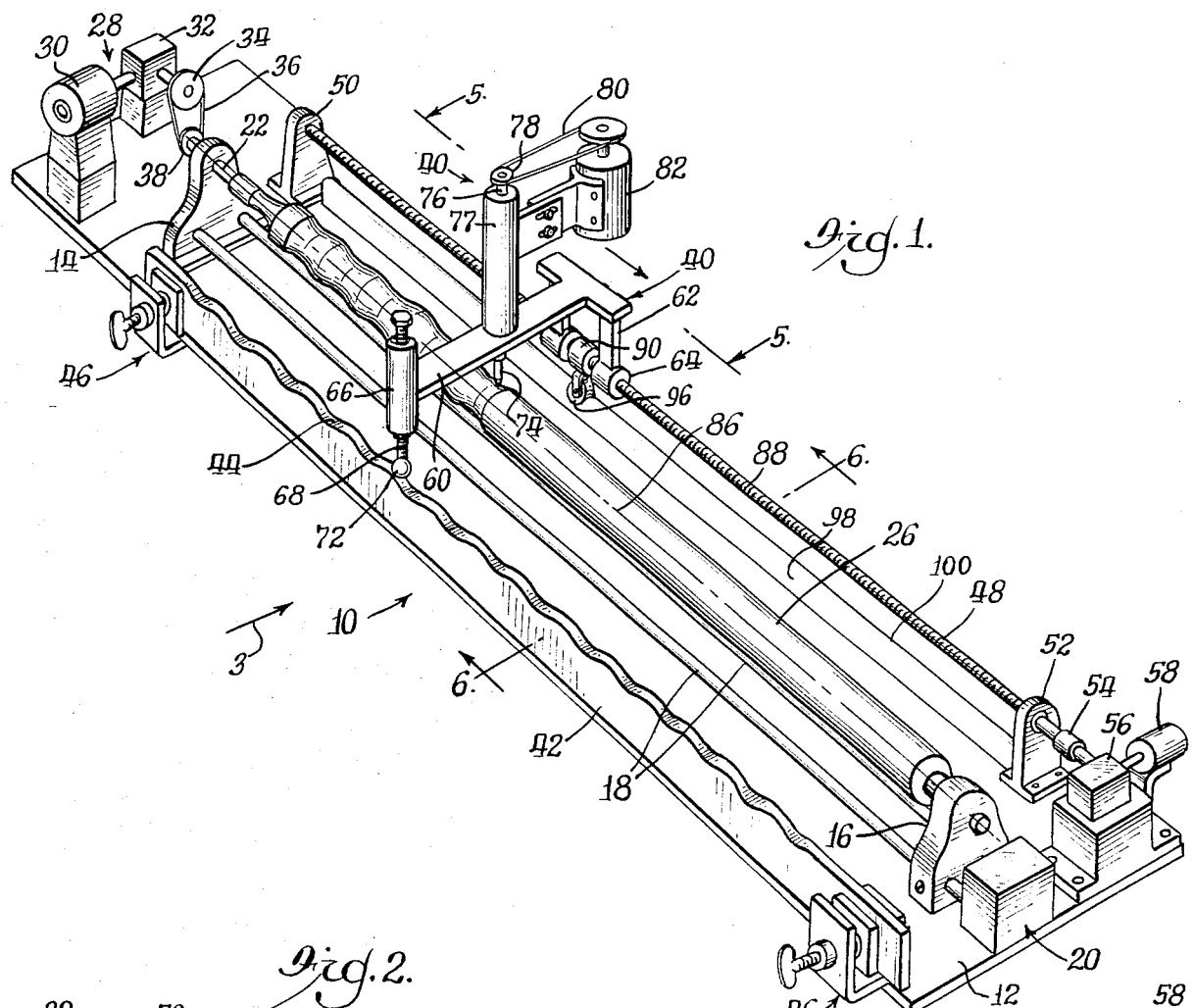
FIG. 1 is a perspective view of a lathe embodying the features of the present invention.
Figure 2:
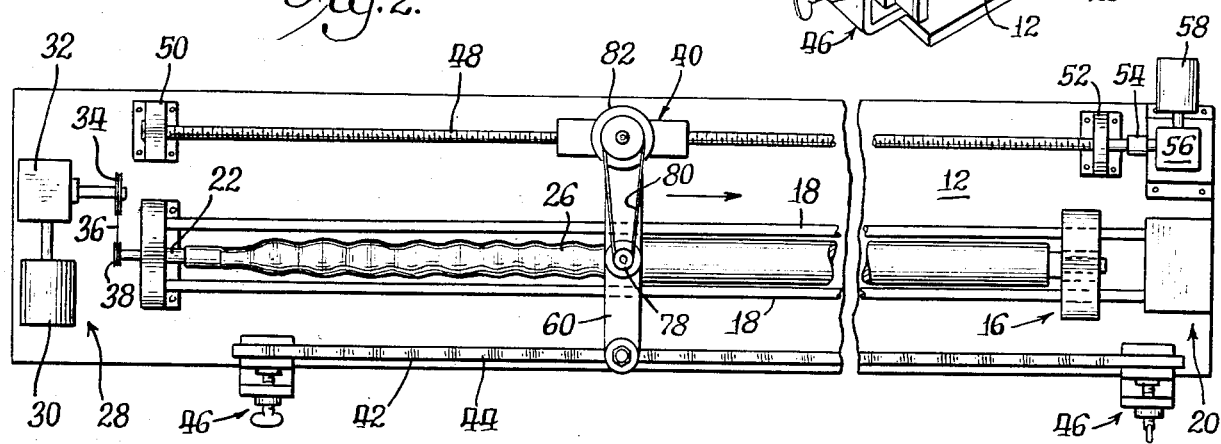
FIG. 2 is a top view of the lathe.
Figure 3:
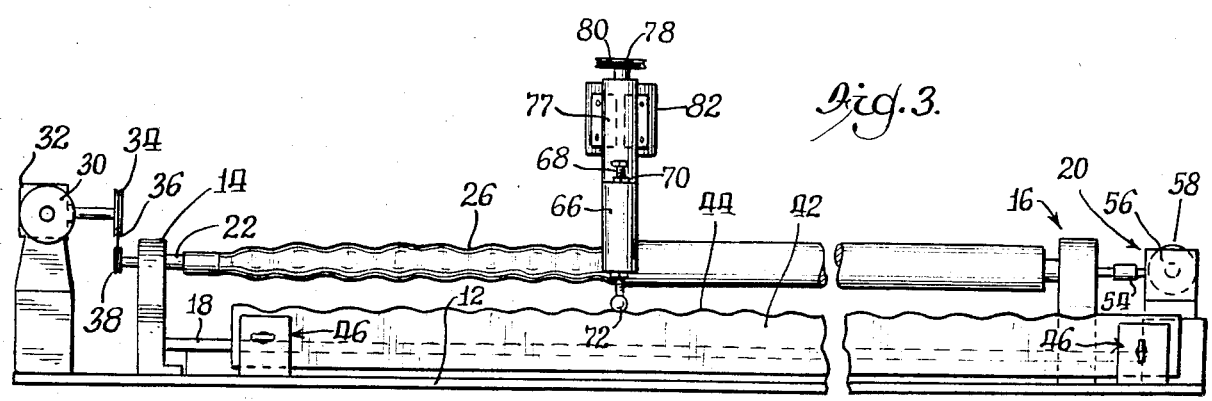
FIG. 3 is a front view of the lathe, taken from the lower left of FIG. 1, as indicated by the arrow 3.

Referring to detail to the accompanying drawings, it is pointed out that the lathe is shown in its barest essentials, and accordingly somewhat diagrammatic, omitting details in so far as possible, in order to concentrate on the principal features involved. The lathe, as will be understood, includes various components and elements that are standard and known, and description of these components will be kept at a minimum.

The lathe is indicated in its entirety at 10 and includes a base 12 which may be mounted on a suitable stand, or on a work bench. The lathe includes a headstock 14 fixed in position and tailstock 16 slidable on a lathe bed 18 constituted by a pair of laterally spaced rods. The rods are mounted at one end in the headstock 14, and at the other end in a suitable mounting 20. As is well known, the headstock and tailstock include rotatable shafts 22, 24 for mounting the workpiece or woodstock 26 therein, for rotation. The tailstock 16 is shifted along the rods 18, and thus along the lathe bed according to the length of the workpiece, and locked in position in a suitable and known manner. The shafts 22, 24 of course have means for gripping the workpiece.

Drive means indicated in its entirety at 28 is provided for rotating the workpiece, and includes a variable speed motor 30, a speed reducer 32 on which is mounted a pulley 34 operable through a drive belt 36 for driving another pulley 38 mounted on the outer end of the shaft 22, and thus upon actuation of the motor, the workpiece is rotated at a speed according to the variable speed setting of the motor. This motor may also be referred to as the lathe motor.

The lathe includes a carriage indicated in its entirety at 40, to be described in detail hereinbelow, but referred to generally at this point in conjunction with other components.

A template or pattern 42 is provided, this member being in the form of a flat plate extending substantially the length of the lathe. It is mounted vertically on edge, and has an upper template shape or surface 44 used for forming the contour of the workpiece 26.

Suitable means is provided for detachably mounting the template 42 in position, such as clamp means 46, suitably mounted on the base 12. The functioning of the template in conjunction with the carriage 40 will be referred to again hereinbelow.

The lathe also includes a threaded rod or feed screw 48 mounted for rotation in suitable supports 50, 52. At one end, beyond the support 52, the threaded rod is connected by means of a flexible coupling 54 through a gear reducer 56 to a variable speed drive motor 58 also referred to as a carriage travel motor. The threaded rod 48 extends essentially the length of the lathe, and particularly throughout the range of travel of the carriage 40. The threaded rod drives the carriage, and at a speed of movement according to the set or adjusted speed of the motor.

Figure 4:
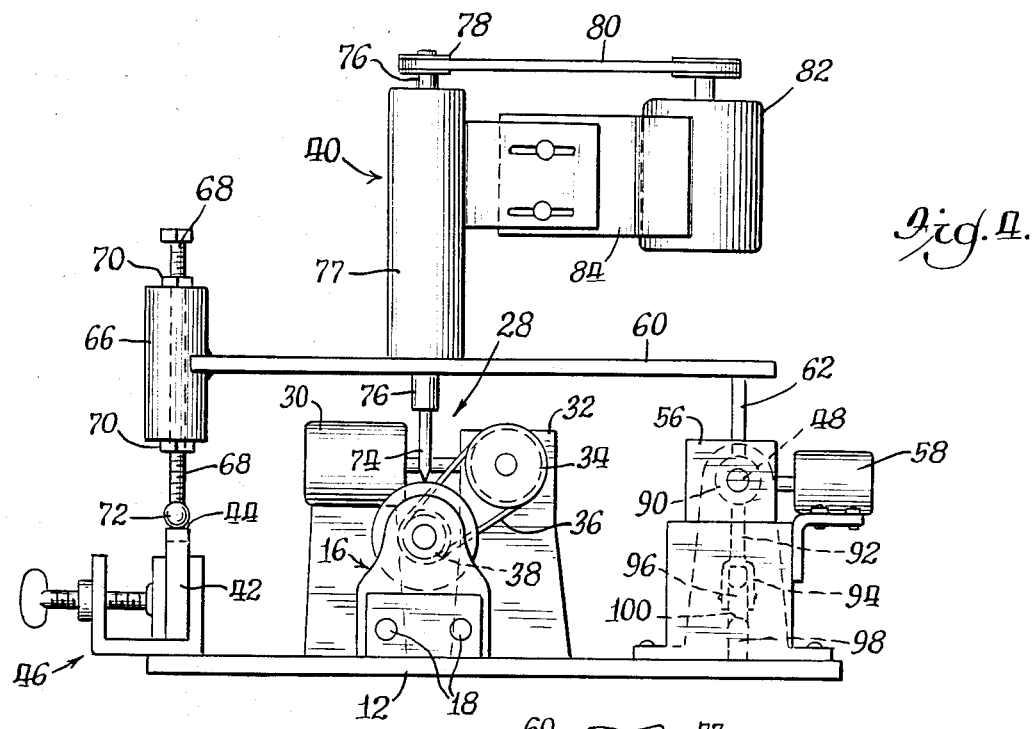
FIG. 4 is an end elevational view of the lathe, taken from the right of the other figures.
Figure 6:
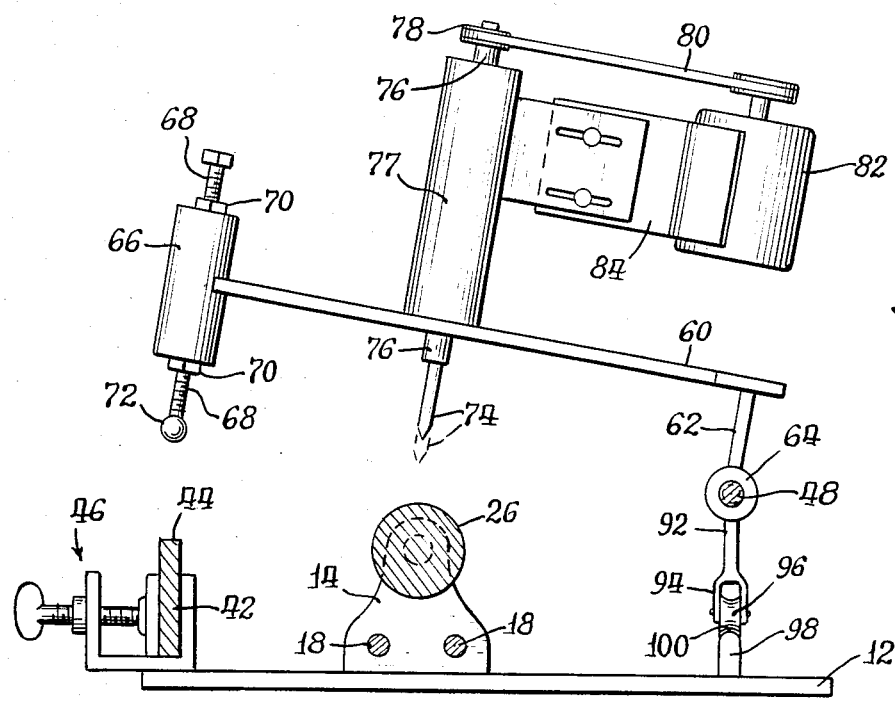
FIG. 6 is a view oriented according to line 6—6 of FIG. 1, and oriented according to FIG. 4, showing the carriage in elevated position, and omitting most details.

The carriage 40 is supported, in its entirety, by the threaded rod 48 and template 42. The carriage includes a main structural member, or body, 60 having at its rear end legs or forked elements 62 mounted on support elements 64. These support elements 64 are tubular in shape, internally threaded, and threaded on the threaded rod 48. The threaded rod 48 supports the rear end of the carriage, and the carriage is swingable about the threaded rod from a lower operating position (FIGS. 1 and 4) to an elevated position (FIG. 6), the support elements 64 swinging or rotating about the threaded rod 48.

Mounted in the swinging end (left end, FIG. 6) of the plate 60 is a template follower member 66 which includes an upright threaded shaft 68 having lock nuts 70 thereon for adjusting and securing the shaft. In the lower end of the shaft 68 is a follower roller 72 which engages and rides on the template 42.

The carriage 40 supports a rotatable cutter bit 74 detachably mounted in a cutter shaft 76, itself mounted in a housing 77 on the plate 60. On the upper end of the shaft 76 is a pulley 78 driven through a belt 80 by a variable speed motor 82 also mounted on the plate 60 by suitable means such as a mounting bracket 84. All of these components just referred to in the carriage 40, and carried by the plate 60, constitute a complete and self contained unit and as mentioned above moves longitudinally along the lathe base, and thus along the workpiece 48.

For convenience in referring to the structure of the lathe, and its operation, it is pointed out that the workpiece or woodstock 26 extends longitudinally of the lathe and is rotated about an axis 86; the threaded rod 48 is parallel with the workpiece and is rotated about a longitudinal axis 88. The template 42 also extends parallel with the workpiece and threaded rod.

Figure 5:
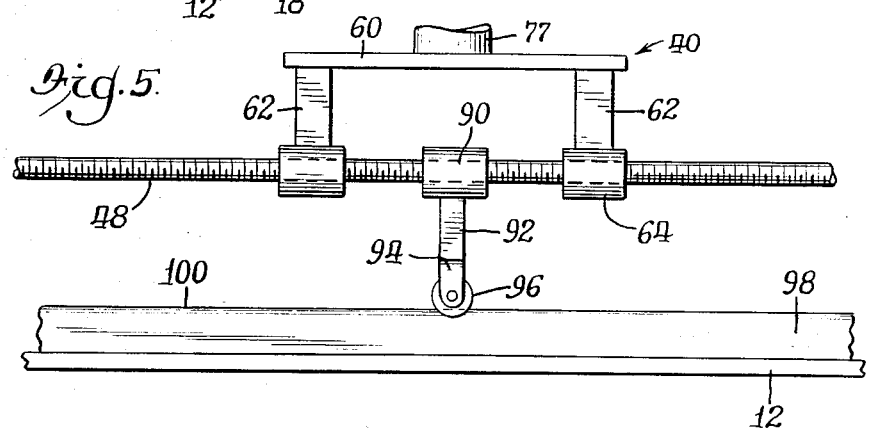
FIG. 5 is a detail view taken at line 5—5 of FIG. 1.

The threaded rod 48 constitutes the drive for the carriage, as pointed out above, and in view of its relatively great length, a support means is provided for preventing the rod from sagging, particularly under the weight of the carriage 40. For this purpose a support member 90 is provided. This support member includes an element 90 (FIGS. 1 and 5), similar to the elements 64, tubular in shape and internally threaded, and threaded on the threaded rod 48. Mounted on the element 90 is a bracket 92 extending downwardly, having a fork 94 in which is mounted a roller 96. This roller has a concave tread or peripheral surface which engages a rail or rod 98 mounted on the base 12 and extending substantially the length of the lathe. This rail 98 has a curved upper surface 100, forming a rod-like shape, on which the pulley 98 rides. This rail, due to the curved shapes of its top surface and the roller, prevents transverse swinging movement of the member 92 about the threaded rod 48. Upon rotation of the threaded rod, the carriage of course moves, as mentioned, and in direct correlation thereto, the mounting means 90 moves along the rod, and is maintained in direct relation to the carriage, which as shown in directly between the mounting elements 64, so that regardless where the carriage is positioned along the length of the threaded rod, the supporting member 90 is positioned at the same location as the carriage, and therefore effective for supporting the carriage.

In the operation of the lathe, after the workpiece is put in position, the carriage is moved down to its lower operating position. Previous to this, or in conjunction therewith, the template follower 66 is adjusted vertically to position the cutter bit 74 at the proper height according to the dimension of the workpiece 26. The cutter bit 74 is also adjustable as indicated by the dot-dash line position in FIG. 6. In the operation of the lathe, as the carriage is moved along the lathe by the threaded rod 48, the template follower follows the upper surface 44 of the template, guiding the vertical movements of the cutter bit according to the shape of the template, the cutter bit then cutting the shape of the workpiece according to the shape of the template. As will be understood, the template is provided with a predetermined shape according to the desired shape of the workpiece, and a different template is provided for each side and shape of workpiece.

An important feature of the invention is the independent speed variability of each of the drive motors 30, 58, 82. Another great and important feature of the invention is the rotatability of the cutter bit 74. Heretofore, with a stationary cutter bit, it was necessary to rotate the workpiece at an extremely high rate, in order for the cutter bit to effectively cut into the workpiece, but in the use of a rotating cutter bit, the workpiece can be rotated at a much slower rate, because the cutting effect is produced mostly, or at least to a greatly enhanced degree, by the rotating bit. Various kinds of wood must be treated differently in a lathe. One of the principal characteristics of the wood to be considered is the softness/hardness thereof. In the case of relatively soft wood, only a rougher surface can be produced, compared with hardwood in any given speed of rotation. In order to provide a smoother surface, it was necessary to rotate the workpiece at a much higher speed, and even with that feature, it was almost always necessary to use a subsequent sanding step. In the present case woods that are extremely soft, and of virtually any degree of softness, can be turned to an extremely fine finish, and not require a subsequent sanding step.

Other characteristics of the wood may affect the cutting operation, and the speeds of operation of the various components of the lathe are adjusted to accommodate those characteristics. The three components mentioned, namely, the rate of rotation of the workpiece, the rate of rotation of the cutter bit, and the speed of movement of the carriage, are all independently adjustable in the operation of the lathe, according to the interaction of those characteristics. The optimum combination of speeds of the three different components is found for each particular kind of wood, and thereafter special attention need not be given to the operation of the lathe, but the lathe is set in operation and further attention may consist merely of occasional monitoring, the operation being substantially entirely automatic.

Another advantage of the invention is the simplicity of the overall structure, enabling the carriage to be swung out of operating position, to provide easy access to the space thereunder.

Another great advantage of the construction is that most of the components and elements are shelf items and need not be specially designed, the only special design necessary being the overall construction for mounting those elements.

The cutter bit is detachably mounted in position, and the lathe is adapted to the use of any of a wide variety of sizes and shapes of such cutter bits to accommodate a wide variety of shapes to be formed on the workpiece.

Still another advantage of the invention is that shapes can be formed on the workpiece that are essentially longitudinal in direction, and not circumferentially continuous. For example, the workpiece can be held stationary against rotation, and the cutter bit, while being rotated, moved longitudinally along the workpiece, cutting such longitudinal shape.

The design of the lathe enables the utilization of relatively small, and correspondingly inexpensive, drive motors. In previous cases where the workpiece must be rotated at a high rate, great power was required, but in the present case the workpiece may be rotated slowly and a much smaller motor therefore can be utilized for that step. As a practical example of size and capacities involved, but not limiting the invention thereto, it is pointed out that heretofore the workpiece was rotated in the range of about 600 to 3600 rpm, but in the present case the motor may be of speeds of only up to 100 rpm, and because of the slow rotation of the workpiece required, a motor of only 1/15 hp, for example, may be utilized. This slow rotation also eliminates whipping and wobbling of the workpiece. For driving the cutter bit, a motor of up to 10,000 rpm capacity may be used, rotating the cutter bit at a higher rate of speed, and producing a smooth and precise surface of the wood. Similarly, the motor for driving the threaded rod may be of 1/15 hp capacity, and having speeds of up to 100 rpm.

Still another great advantage of the invention is the avoidance of heat buildup in the workpiece. Because of the continued rotation of the workpiece, the cutter bit is not held for an excessive time at any one point on the workpiece, and accordingly the rotation of the workpiece, and the travel of the carriage, prevent the buildup of the heat at any one point on the workpiece.

I claim:

1. A woodworking duplicating lathe comprising,
    a base,
    a headstock and a tailstock on the base operable for supporting a workpiece for rotation on a longitudinal axis located generally centrally, transversely, of the base,
    a variable speed motor operatively connected to said headstock for rotating the workpiece,
    a rotatable threaded rod at one side of the base and parallel with said longitudinal axis,
    a variable speed motor operatively connected to said threaded rod for rotating the threaded rod,
    a template mounted on the base on the side thereof opposite the threaded rod and extending essentially parallel with said longitudinal axis,
    a carriage extending transversely of the base above the workpiece, mounted at one end on the threaded rod and movable by the threaded rod in the direction of said longitudinal axis of the workpiece, and swingable on the threaded rod about the axis of the threaded rod, and having a template follower on its other end,
    a rotatable cutter bit in the carriage at a generally central position thereof,
    a variable speed motor on said carriage for rotating the cutter bit,
    the carriage being swingable between a lower operating position in which the template follower engages the template and the cutter bit engages the workpiece, and an upper inactive position in which the workpiece is exposed to access,
    means supporting the threaded rod between the ends of the latter, and movable therealong in response to rotation of the threaded rod, and
    rail means on the bed engageable by said supporting means, and providing bearing support for the supporting means.

2. A woodworking duplicating lathe according to claim 1 wherein,
    the carriage is supported at one end entirely by the threaded rod, and when it is in its lower operating position, it is supported entirely by, and only by, both the threaded rod and the template.

3. A woodworking duplicating lathe according to claim 1 wherein,
    said supporting means for the threaded rod is adjacent the carriage and moves along the threaded rod adjacent the carriage in the movements of the latter.

4. A woodworking duplicating lathe according to claim 3 wherein,
    the carriage includes a pair of support elements threadedly engaging the threaded rod at locations spaced along the threaded rod, and
    the means supporting the carriage includes mounting means threadedly engaging the threaded rod at a position between said support elements.

5. A woodworking duplicating lathe according to claim 1 wherein,
    the template is in the form of a plate having a profile face on one edge, and
    the lathe includes means mounting the template in vertical position with the profile face directed upwardly, and for so mounting it detachably and for vertically adjusted positions and to enable selective use of templates having different profile faces.

* * * * *